(No Model.) 3 Sheets—Sheet 2.

J. B. ATWATER.
ELECTRIC MOTOR.

No. 274,101. Patented Mar. 20, 1883.

Witnesses:
J. P. Theodor Lang.
Robt. L. Fenwick.

Inventor:
John B. Atwater
by his Atty.
Fenwick & Lawrence (No Model.) 3 Sheets—Sheet 3.
J. B. ATWATER.
ELECTRIC MOTOR.
No. 274,101. Patented Mar. 20, 1883.
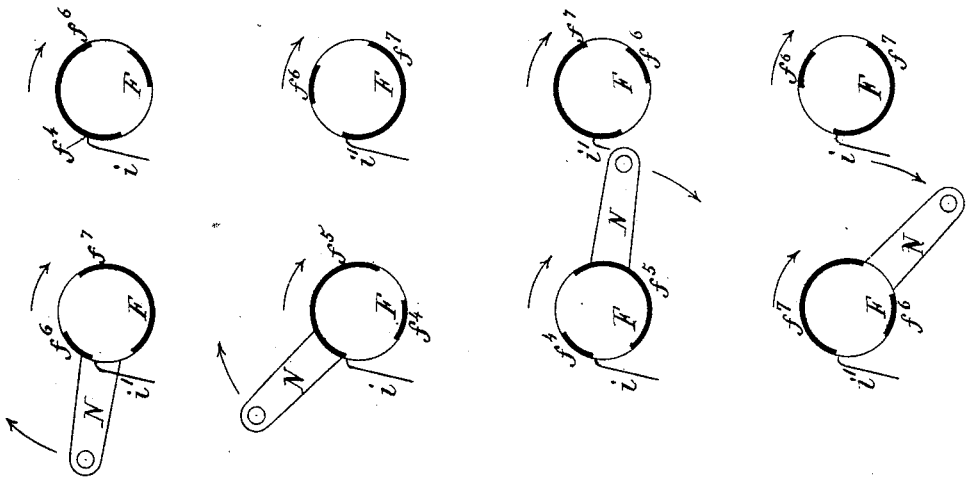
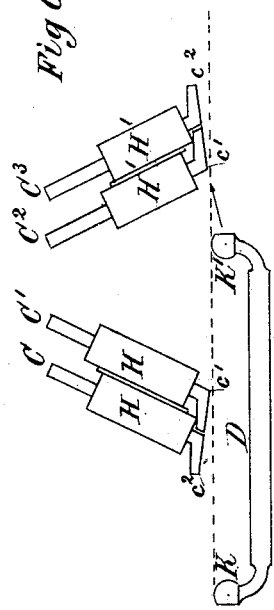
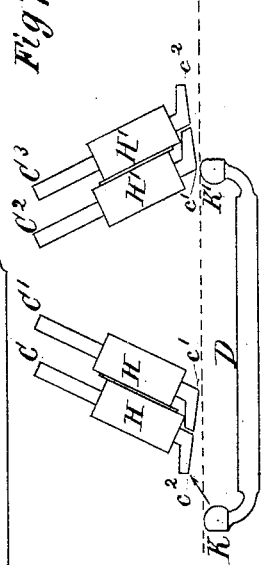
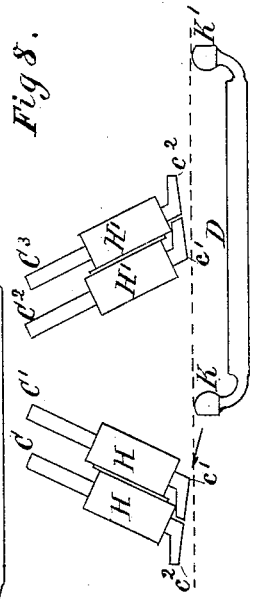
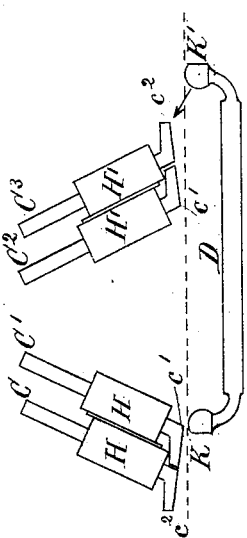
Witnesses:
J. P. Theodore Lang.
Robt. L. Fenwick
Inventor.
John B. Atwater
by his attys
Fenwick Lawrence

UNITED STATES PATENT OFFICE.

JOHN B. ATWATER, OF CHICAGO, ILLINOIS.

ELECTRIC MOTOR.

SPECIFICATION forming part of Letters Patent No. 274,101, dated March 20, 1883.

Application filed July 7, 1882. (No model.)

*To all whom it may concern:*

Be it known that I, JOHN B. ATWATER, a citizen of the United States, residing at Chicago, in the county of Cook and State of Illinois, have invented a new and Improved Electric Motor, of which the following is a specification.

My invention relates, first, to a combination, in an electro-magnetic motor, of armatures carried by a reciprocating connecting device, and two or more reversely-set magnets which are formed respectively with a heel or angular bend, and an attractive surface which extends from the heel or bend to the ends of the magnets, and is on a line inclined with respect to the line of travel of the armature, whereby any desired length of stroke may be secured; second, to an improved commutator, in combination with two or more reversely-set magnets, armatures, a reciprocating connecting device, and a power-transmitting mechanism, whereby, after the stroke is finished and the connection is broken, the magnets just disconnected are again momentarily connected and made to aid in making the return-stroke just prior to the complete turning off of the current from the said magnets into the magnets at the other end of the machine; third, to an improved construction of commutator for a magnetic motor, as will be hereinafter described; fourth, to a novel combination of an angularly-bent magnet, provided with an inclined attractive surface, with a reciprocating armature which is connected with power-transmitting mechanism; fifth, to a novel combination of an electro-magnet with a reciprocating armature connected to power-transmitting mechanism, said magnet being bent to form an attractive surface between its heel and ends, and having said attractive surface tapered and applied angularly or inclined with respect to the line of travel of the armature; and, sixth, to two or more magnets having the pole end of one behind the heel end of another, and the attractive surface of all on a line which forms an angle with the line of travel of the armature, as hereinafter set forth.

Figure 1:
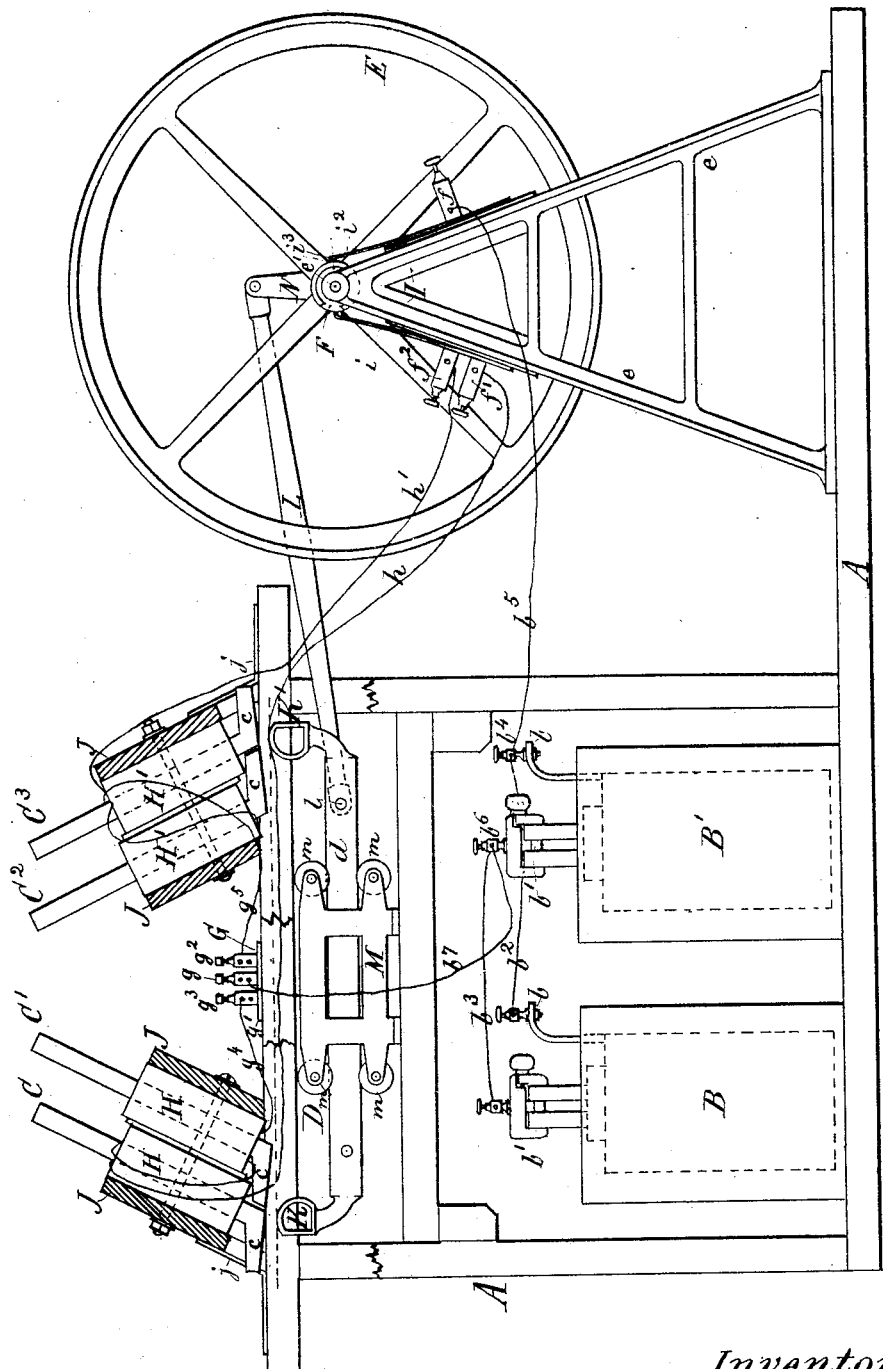
Figure 2:
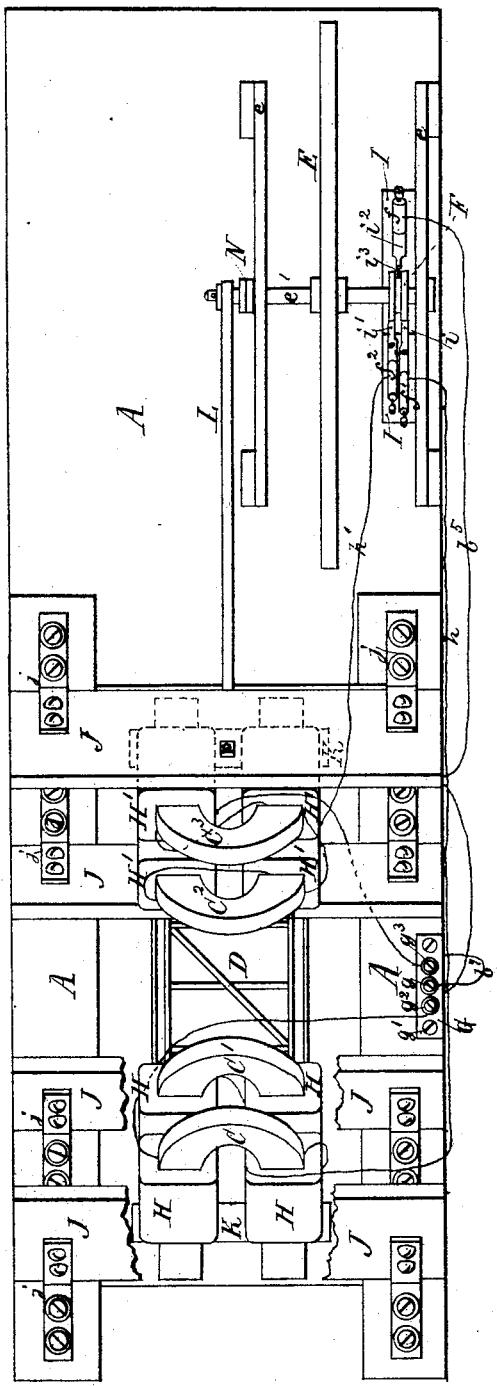
Figure 5:
Figure 3:
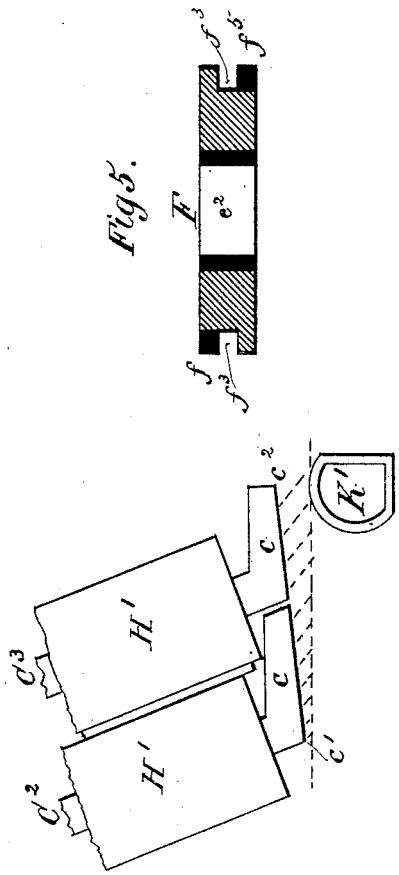
Figure 4:
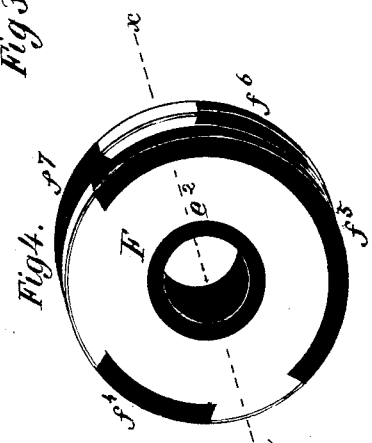

In the accompanying drawings, Figure 1 is a side elevation and partial section of my electro-magnetic motor. Fig. 2 is a top view of the same. Fig. 3 is a broken detail view, showing portions of two magnets and an end view of an armature. Fig. 4 is a perspective view of the revolving commutator. Fig. 5 is a section in the line $x$ $x$ of the same. Figs. 6, 7, 8, and 9 are four diagrams illustrating four different stages of operation of the main parts of my motor.

In the drawings, A represents a suitable frame for the support of batteries B B', magnets C C' C$^2$ C$^3$, and armature-carriage D. E is a crank-wheel, and F a revolving commutator.

The batteries B B' are of well-known construction, $b$ being the zinc pole or positive pole, and $b'$ the carbon or negative pole. The positive poles $b$ are coupled by a conducting-wire, $b^2$, and the negative poles are coupled by a wire, $b^3$. From the binding-screw $b^4$ of one of the positive poles a conducting-wire, $b^5$, connects the positive pole of the battery to a binding-screw, $f$, of a commutator, and from the binding-screw $b^6$ of one of the negative poles a conducting-wire, $b^7$, connects the negative pole of the battery to a binding-screw, $g$, of a distributer, G. The distributer G consists of a conducting-plate, $g'$, and a number of binding-screws, $g$ $g^2$ $g^3$, and the latter, $g^2$ $g^3$, serve for fastening the ends of connecting-wires $g^4$ $g^5$, whereby the negative current is conducted to the respective coils H H' of the magnets. The coils H belong to the magnets C C' and the coils H' to the magnets C$^2$ C$^3$. The construction of the said coils is that usually adopted, save that the two sets H H' are not connected together, as they are separately and alternately used and operated, as will be seen. A conducting-wire, $h$, connects the coils H with the commutator F by means of a binding-screw, $f'$, and another conducting-wire, $h'$, connects the coils H' with the commutator by means of a binding-screw, $f^2$. The binding-screw $f'$ is fastened to a spring, $i$, of platinum, (preferably,) and the binding-screw $f^2$ to a similar spring, $i'$. The said binding-screws and springs are fastened to a non-conducting block, I, suitably attached to one of the standards $e$ of the crank-wheel. The binding-screw $f$ is fastened to a platinum spring, $i^2$, having a pin, $i^3$, on its end, and the said binding-screw and spring are both attached to the block I. The springs $i$ $i'$ and the pin $i^3$ bear upon the commutator F. This commutator is made of conducting metal, and is suitably insulated from the shaft $e'$ of the crank-wheel by a non-conducting bushing, $e^2$. It is provided with two elevated rims separated by a groove, $f^3$, into which the pin $i^3$ bears, and with sections $f^4 f^5 f^6 f^7$ of non-conducting material, such as hard rubber. The springs $i\ i'$ bear each upon one of the rims of the commutator, and as the commutator revolves the said springs alternately touch and travel over the conducting and non-conducting surfaces formed upon the commutator, and thereby close and open the respective circuits of the battery.

The magnets $C\ C'\ C^2\ C^3$ are suitably fastened in pairs between inclined stays or steadying-boards J, which are attached to the top of the frame A by means of angle-irons $j$, and the two pairs of magnets stand at opposite angles to each other. Below the coils H H' these magnets are formed with angular bends or heels $c'$ and a long attractive surface, $c$, of taper form from the heel to the pole ends, so as to give an increased body of metal toward the heel. The attractive portion $c$ might be of uniform thickness from the point of its union with the body of the magnet to its pole ends; but I prefer to have it tapering, as it will probably operate more effectively when made so. The surfaces beyond these heels are arranged at an inclination with the line of motion of two armatures, K K'. These armatures are fastened to two side bars, $d$, of a carriage, D, of suitable construction, and the side bars are fitted between two pairs of grooved guide-rollers, $m$, of a stationary supporting-frame, M, suitably fastened to the frame A. The distance of the armatures K K' is such that when one stands at the end of its stroke the other stands in the range of attraction of its relative magnet, preparatory to the return-stroke of the carriage D. The carriage D has a connecting-rod, L, suitably attached to it at $l$, whereby a crank, N, on the shaft $e'$ is revolved. By forming the heels $c'$ and the attractive surface $c$ upon the magnet in the described manner the attractive power of the magnet, when charged, centralizes at the heels or bends $c'$ and diminishes at the ends $c^2$, and by arranging the magnet, as shown, so that the attractive surface $c$, beyond the heels $c'$, stands at a slight inclination to the line of travel of a movable armature, (the ends $c^2$ being higher than the heels $c'$,) the armature is caused to move from the ends $c^2$ toward the heels $c'$.

Operation: In Fig. 6 the crank N is represented as just having passed its dead-center, and at that stage of operation the magnets $C^2 C^3$ have just become charged and begin to attract the armature K' in the direction of the arrow, while the conducting-surface between the non-conducting surfaces $f^6 f^7$ passes under the spring $i'$, and when the armature K' arrives below the heel $c'$ of the magnet $C^2$, as seen in Fig. 7, the surface $f^7$ comes in contact with the spring $i'$ and the magnets $C^2 C^3$ become inactive. In the meantime the non-conducting surface $f^5$ has left the spring $i$ and the conducting portion of the commutator has come in contact with the spring $i$, whereby the magnets C C' become charged as soon as the magnets $C^2 C^3$ become inactive. The armature K is now moved in the direction of the arrow, as seen in Fig. 7, and when it arrives under the heel $c'$ of the magnet the surface $f^4$ passes under the spring $i$ and the magnets C C' become inactive, the wheel E continues to revolve without motive power until the crank has passed its dead-center, as seen in Fig. 8. When this takes place the surface $f^4$ leaves the spring $i$ and the magnets C C' become charged, again attracting the armature K in the direction of the arrow until it arrives under the heel $c'$ of the magnet C', as seen in Fig. 9, when the surface $f^5$ passes under the spring $i$ and the magnets C C' become inactive. Simultaneously with this the surface $f^7$ leaves the spring $i'$ and the magnets $C^2 C^3$ become charged and the armature K' is moved in the direction of the arrow. When the armature K' has arrived under the heel $c'$ of the magnet $C^2$ the surface $f^6$ passes under the spring $i'$, whereby the magnets $C^2 C^3$ become inactive. The wheel E now continues revolving until the crank again arrives at the position shown in Fig. 6, when the described operation will be repeated.

It will be seen from the foregoing description and accompanying drawings that an attractive surface between the heel or bend and the pole ends of the magnet of greater length can be secured by the use of one electro horseshoe-magnet than could be obtained from several electro horseshoe-magnets which are not bent or formed with a heel and a long attractive surface beyond the heel, and which attract simply at their pole ends; and, further, that by placing the attractive surface of several of these bent horseshoe-magnets in a line inclined to the line of travel of an armature a much greater length of attractive surface can be secured than is practicable with the same number of magnets not formed with a bend or angle end, though the attractive or pole ends should be set on an inclined line with respect to the line of travel of the armature.

Whenever it is desired to get an increased or greater power than is possible with a single carriage, as represented, I propose to duplicate the same carriage and magnets on each side of the machine and to have the pitmen connected with crank-arms set at proper angles for overcoming dead-centers of the intermediate carriage. Thus with a double machine I use two cranks set at right angles; with three machines I use three cranks set at one hundred and twenty degrees toward each other, and so on.

It is best to have the attractive surfaces of the magnets, when used in pairs or numbers, of different lengths—that is, the first magnet with shorter attractive surface than the second—so that it will have sufficient power near its pole ends to reach the armature from a greater distance when the armature is below, yet in front of the magnet, and the second magnet sufficient power to attract the armature beyond the heel of the first magnet.

What I claim as my invention, and desire to secure by Letters Patent, is—

1. In an electro-magnetic motor, the combination, with armatures carried by a reciprocating connecting device, of two or more reversely-set horseshoe-magnets which are formed respectively with a heel or angular bend and an attractive surface which extends from the heel or bend to the pole ends of the magnets, and is on a line inclined with respect to the line of travel of the armatures, substantially as and for the purpose described.

2. In a magnetic motor, the combination of the commutator F, consisting of a block, I, with bushing $e^2$, surfaces $f f^4 f^5 f^6 f^7$, and groove $f^3$, and provided with springs $i\, i'\, i^2$ and pin $i^3$, with two or more reversely-set horseshoe-magnets, armatures, a reciprocating connecting device, and a power-transmitting mechanism, this combination being such that after the stroke is finished and the connection is broken the electro horseshoe-magnets just disconnected are again momentarily connected and made to aid by their heel portion in making the return-stroke just prior to the complete turning off of the current from the said magnets into the magnets at the other end of the machine, substantially as described.

3. In a magnetic motor, the commutator F, consisting of a block, I, having bushing $e^2$, surfaces $f f^4 f^5 f^6 f^7$, and groove $f^3$, and provided with springs $i\, i'\, i^2$ and pin $i^3$, substantially as and for the purpose described.

4. An angularly-bent horseshoe-magnet provided with an inclined attractive surface which extends from heel to toe of the magnet, in combination with a reciprocating armature which is connected with power-transmitting mechanism, substantially as and for the purpose described.

5. The combination, with a reciprocating armature connected to power-transmitting mechanism, of an electro-magnet bent to form an attractive surface between its heel and pole ends, and having said attractive surface tapered and applied angularly or inclined with respect to the line of travel of the armature, substantially as and for the purpose described.

6. Two or more magnets arranged substantially as described—that is, with the pole end of one behind the heel of another and the attractive surface of all on a line which forms an angle with the line of travel of the armature, substantially as and for the purpose described.

JOHN B. ATWATER.

Witnesses:
ROBT. L. FENWICK,
J. P. THEODORE LANG.